(12) United States Patent
Niioka

(10) Patent No.: US 8,470,085 B2
(45) Date of Patent: Jun. 25, 2013

(54) SYSTEM AND METHOD FOR CLEANING COAL-BURNING POWER PLANT EXHAUST GASES

(76) Inventor: Yoshio Niioka, Ichino-Miya (JP)

(*) Notice: Subject to any disclaimer, the term of this patent is extended or adjusted under 35 U.S.C. 154(b) by 0 days.

(21) Appl. No.: 12/614,257

(22) Filed: Nov. 6, 2009

(65) Prior Publication Data

US 2012/0055341 A1   Mar. 8, 2012

(30) Foreign Application Priority Data

Nov. 6, 2008 (JP) ................. 2008-310260

(51) Int. Cl.
*B01D 46/00* (2006.01)
*B01D 50/00* (2006.01)
(52) U.S. Cl.
USPC ............. 96/230; 55/498; 96/233; 96/240; 96/371

(58) Field of Classification Search
USPC .............. 55/498, 520, 529; 96/230, 233, 240, 96/371; 210/297, 400; 422/168, 169
See application file for complete search history.

(56) References Cited

U.S. PATENT DOCUMENTS

| | | | |
|---|---|---|---|
| 2,994,406 A * | 8/1961 | Hemeon | 96/230 |
| 5,202,017 A * | 4/1993 | Hunter | 210/143 |
| 5,480,465 A * | 1/1996 | Cox | 55/472 |
| 5,620,667 A * | 4/1997 | Nemoto et al. | 422/171 |
| 2007/0280868 A1 * | 12/2007 | Cisneros | 423/220 |

* cited by examiner

*Primary Examiner* — Jill Warden
*Assistant Examiner* — Joye L Woodard
(74) *Attorney, Agent, or Firm* — Muncy, Geissler, Olds & Lowe, PLLC

(57) ABSTRACT

A system for cleaning particulates and CO2 from power plant exhaust gases is described. The system includes a particulate filter for exhaust gases, a CO2 decomposition component, and a filter for cleaning electrolyte solution from the decomposition component.

8 Claims, 10 Drawing Sheets

Fig_7

SYSTEM AND METHOD FOR CLEANING COAL-BURNING POWER PLANT EXHAUST GASES

RELATED APPLICATIONS

This application claims priority to Japanese patent application 2008-310260, filed Nov. 6, 2008. It also relates in part to Heil 1-51310, patent application 2003-418708, patent application 2007-149753, U.S. patent application Ser. No. 12/072,059, and U.S. patent application Ser. No. 12/188,681.

FIELD OF THE INVENTION

This invention relates to systems and methods for activity-based product searching, and more particularly to a user interface providing activity-based product information based on features and activities extracted from raw product data.

BACKGROUND OF THE INVENTION

The following discussion is provided solely to assist the understanding of the reader, and does not constitute an admission that any of the information discussed or references cited constitute prior art to the present invention.

The anthropogenic generation of the greenhouse gas carbon dioxide (CO2) is generally recognized as a significant contributing factor in climate warming. As a result, many different approaches have been proposed for reducing such release, with the majority focusing on carbon sequestration and/or recycling.

Anthropogenic greenhouse gas emissions are generally accepted as being a significant fact in climate warming. A major component of such greenhouse gases is carbon dioxide (CO2). As a result, reducing the release of carbon dioxide has become an important consideration. The present invention address this problem by providing a system for significantly reducing CO2 emissions from gases, especially exhaust gases (e.g., exhaust gases from coal fired power plants). The system involves devices or components which filter the gas stream to remove particulates, converts CO2 to carbon and oxygen and separates out the carbon. The system can also include a filter for removing carbon particles from an electrolyte solution used in the CO2 converter, thereby increasing its useful lifetime.

Thus, a first aspect of the invention concerns a system for cleaning CO2-containing gases and decomposing CO2, where the system includes a fiberbased exhaust gas particle filter and a CO2 decomposition and separation device having gas passage connection with the outlet of the fiber-based exhaust gas particle filter. The CO2 decomposition and separation device utilizes an electrolyte solution in decomposing CO2. Advantageously the system may also include an electrolyte filter which filters carbon particles from the electrolyte.

In particular advantageous embodiments, the fiber-based exhaust gas particle filter is a spiral frame filter; the exhaust gas particle filter is a filter as specified for an embodiment of the spiral frame filter below or otherwise described herein; the electrolyte filter is a declined angle filter, such as specified for an embodiment of electrolyte filter below or otherwise described herein.

A related aspect concerns an exhaust gas filter which is a spiral frame filter in which the filter material is mounted in spiral manner about a central rotational shaft.

In particular embodiments the filter includes a tank having exhaust gas inlet and outlet connections, and having rotatably mounted therein a spiral shaped filter element. The filter element can, for example, include a spiral shaped frame attached to a central shaft with a metal net (or other substantially perforated and preferably substantially rigid support surface (preferably ferrous metal) attached to the spiral shaped frame and substantially spanning the space between the frame and the shaft; a filter panel which includes a fiber mounting disk with a large number of fibers attached to a surface thereof, mounted on the spiral shaped frame and the metal net or other support surface.

In certain cases, the spiral shaped frame is attached to the central shaft with at least one locking collar; the fibers are attached in a large number of fine holes in the fiber mounting disk; the filter frame and/or the metal net or other support are primarily made of ferrous metals; the filter panel is magnetically mounted to the spiral frame and/or the metal net (usually for ferrous metal spiral frames and/or support surfaces).

Also in certain embodiments (especially for ferrous metal spiral frames and/or supports, the filter panel is mounted on the spiral frame and metal net (or other support with a gap adjusting panel attached to the fiber mounting disk with a magnetic sheet attached to the gap adjusting panel; the gap adjusting panel is attached to a magnetic sheet installation which is attached (e.g., glued) to the magnetic sheet.

Further advantageous embodiments include a washer (e.g., a spray washer) which washes particles from said fibers; the washer includes a plurality of washing water nozzles fluidly connected with a wash water supply line.

In still further advantageous embodiments, the filter includes a plurality (e.g., 2, 3, or 4, or at least two filter tanks connected in parallel; parallel connection filter tanks include gas switching valves installed in the exhaust gas inlet connection pipes and exhaust gas outlet connection pipes for the filter tanks to control the flow of the exhaust gas through the tanks (e.g., a valve for the inlet and outlet for each tank or for each parallel tank set, such that the valves can isolate each tank from the other or others, or each set of tanks from another set or sets).

Yet another related invention concerns an electrolyte particle filter which includes an outer body, and a declined, conveyor-mounted fiber particle filter mounted within the outer body.

In particular embodiments, the electrolyte particle filter includes an electrolyte feed pipe which supplies electrolyte at or near the top of the declined, conveyor-mounted particle filter, and an electrolyte return pipe which removes filtered electrolyte after passage over the declined, conveyor-mounted particle filter; the filter includes rotatable conveyor rolls with a conveyer belt bearing a carbon collection fiber filter to collect carbon microparticles from the electrolyte, an may further include a washer which washes carbon particles from the carbon collection fiber filter, creating a carbon particle suspension. Such carbon particle suspension can be past to a carbon particle separation which separates carbon particles from electrolyte solution, e.g., a centrifugal separator which receives the suspension from the carbon collection fiber filter.

Also in particular embodiments, the electrolyte particle filter of also includes an angle adjustor which adjusts the declination angle of the filter (e.g., by adjusting the declination angle of the outer body or the declination angle of the conveyor rolls and conveyor mounted filter.

Additional embodiments will be apparent from the Detailed Description and from the claims.

BRIEF DESCRIPTION OF THE DRAWINGS

Initial FIGS. 1-9 describe exemplary filters useful in the present systems.

DETAILED DESCRIPTION

Carbon dioxide ($CO_2$) is the most prevalent, ubiquitous and cited greenhouse gas produced by anthropogenic activities. Greenhouse gases are widely believed to cause or at least significantly contribute to global warming. The present invention addresses the problem of anthropogenic $CO_2$ by providing a practical system to decompose the $CO_2$ gas to carbon and oxygen and can significantly contribute to easing the global warming problem. This devise can be produce cheaply throughout the world.

Thus, this invention can decompose and separate the $CO_2$ gas into carbon and oxygen and eliminate the $CO_2$ gas, but for many sources, fine particles in the $CO_2$-containing gases present processing difficulties. The system of this invention uses a spiral shaped frame and a synthetic fiber to filter those very fine particles included in the $CO_2$ gas before the $CO_2$ gas is sent into the CO2 reduction system to decompose and separate the $CO_2$ gas.

In addition, the electrolyte solution used for decomposition and separation of the CO2 gas will absorb the carbon separated from CO2 gas, and the quantity of the carbon in the electrolyte will increase with repeated use of the electrolyte solution. As a result, the decomposition and separation efficiency of the electrolyte solution will be degraded. This invention uses a declined angle devise to let the electrolyte solution flow through a synthetic fiber and the carbon will stick between those gaps on the synthetic fibers. In an exemplary system, about 70% of the carbon will be trapped, and therefore the electrolyte can be used more times.

With this invention, the CO2 gas will flow to the first device (first major system component) which uses a spiral shaped synthetic filter to clean the fine particles contained in the CO2 gas, the second device (second major system component) will then perform the decomposition and separation of the CO2 gas, and the third device (third major system component) uses a declined angle device to allow the electrolyte to flow through the carbon collection filter. With this design a very low cost and high efficiency system can be manufactured to perform the decomposition and separation of CO2 gas.

This invention is especially well-suited to collect the very fine particles from coal or coke exhaust gases.

Figure 8:
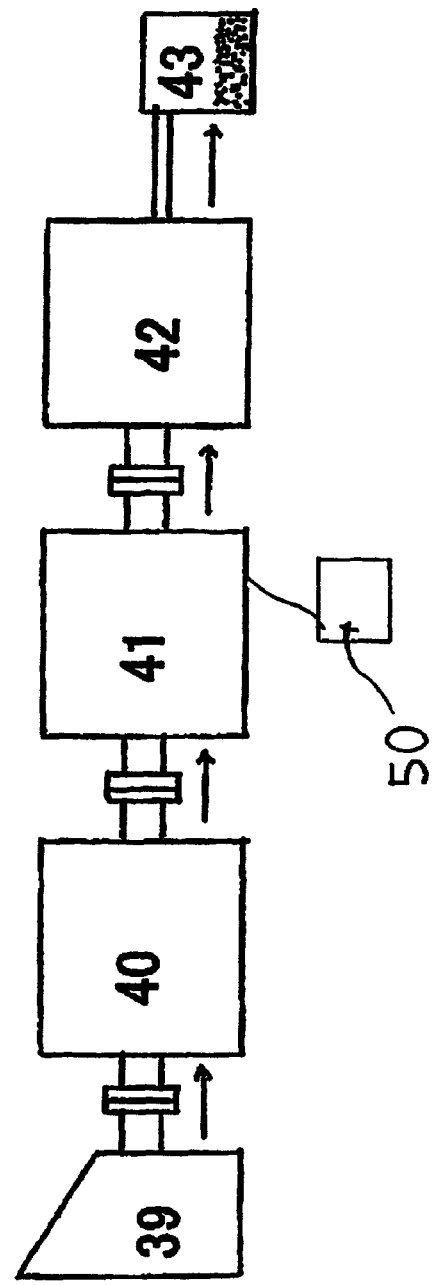
FIG. 8 is a block diagram depicting a complete system to clean the fine particles and CO2 gas in the exhaust gas from a factory.

FIG. 8 is a schematic block diagram showing an exemplary total system designed to clean the fine particles and eliminate the CO2 gas from a factory's or power plant's exhaust gas, and also to collect the carbon produced from decomposition of CO2. As shown schematically in FIG. 8, exhaust gas from source 39 is directed into the spiral shaped fiber filter device 40. After passing through the filter device, the exhaust gas flowing from the spiral shaped fiber filter 40 will be fed to the CO2 decomposition and separation device 41 where the CO2 gas is decomposed and separated. Electrolyte from the CO2 decomposition and separation device is passed over declined angle carbon filter 42. Recovered carbon particles can then be collected in carbon collection device 43. The system is controlled by control box 50. A control box 50 is shown schematically in FIG. 9.

By collecting the carbon from the electrolyte, the quantity of electrolyte used in the CO2 decomposition and separation device 41 is reduced. In addition, the collected carbon becomes a resource. The carbon separated from CO2 is very fine, therefore, can, for example, be used to produce artificial diamond.

This is an exhaust gas cleaning system using a group of devices working together to take the exhaust gas emitted from a factory or power plant, and run the exhaust gases through the spiral shaped fiber filter exhaust gas filter device 40, the CO2 decomposition and separation device 41, and the declined angle carbon filter device 42 to clean the fine particle and eliminate the CO2 gas from the exhaust gas. Finally, the carbon decomposed and separated from CO2 can be collected by the carbon collection device 43. Details of exemplary system components are shown below. The CO2 decomposition and separation component is described in Niioka, U.S. patent application Ser. Nos. 12/072,059, and 12/188,681, both of which are incorporated herein by reference in their entireties, including drawings.

Figure 1:
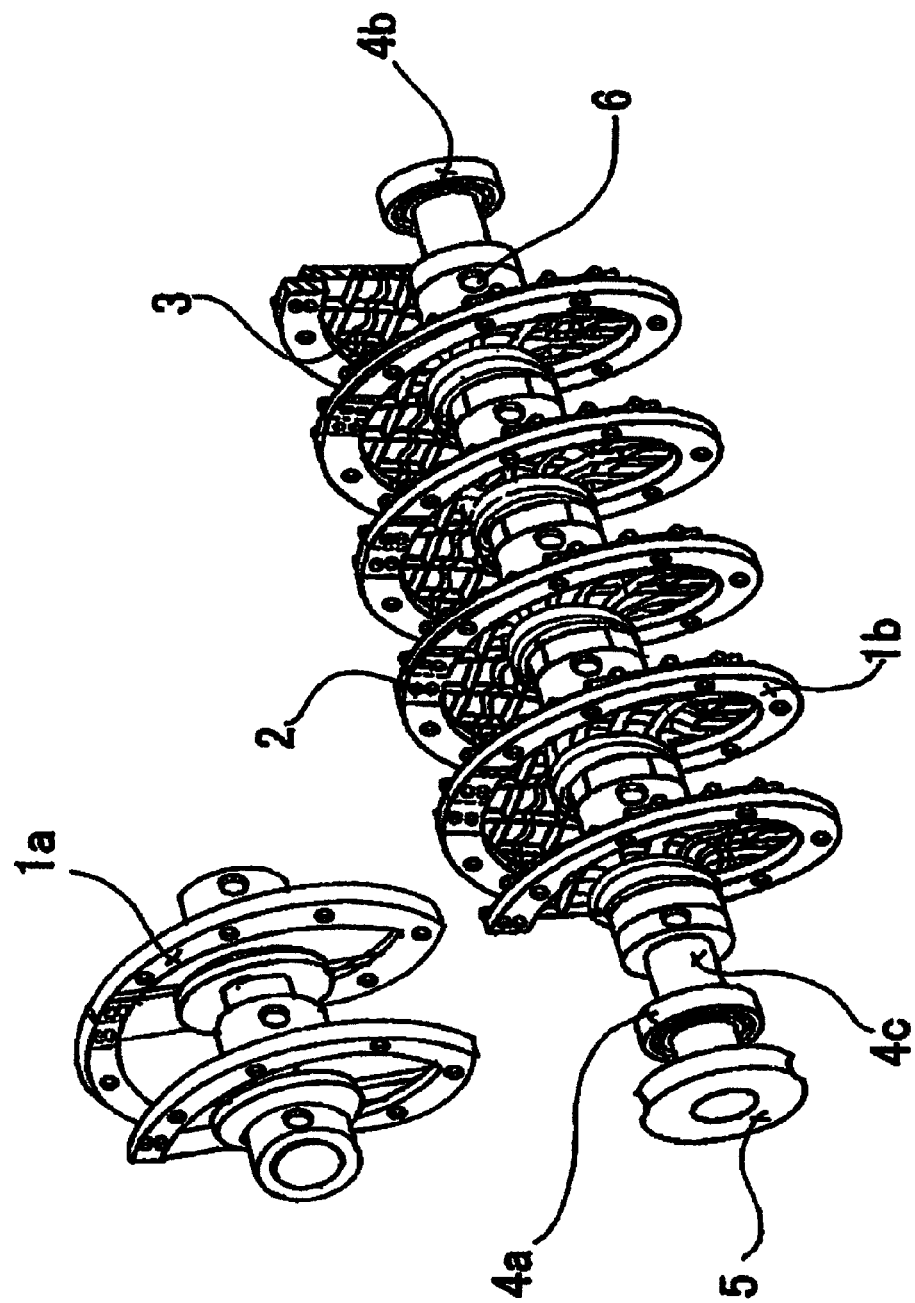
FIG. 1 is a diagram illustrating an exemplary particle filter having a spiral shaped frame and central shaft.

A. Design and Setup of an Exhaust Gas Filter Using a Spiral Shaped Frame Fiber Filter In the illustrated example as shown in the upper portion of FIG. 1, a portion 1$a$ of a spiral shaped filter frame is shown attached to (e.g., mounted on) a central shaft. The full-length spiral frame 1$b$ is shown in the lower portion of FIG. 1, mounted on the shaft 4$c$. A connection metal fitting 2 is used to connect the frame to the shaft and is fixed in place with bolts in bolt holes 6. Of course, the frame could be attached to the shaft in other ways, e.g., by welding. Also mounted on the shaft are carrier bearings 4$a$ and 4$b$, as well as drive pulley 5. Metal net 3 spans the space between spiral frame 1$b$ and shaft 4$c$.

Figure 2:
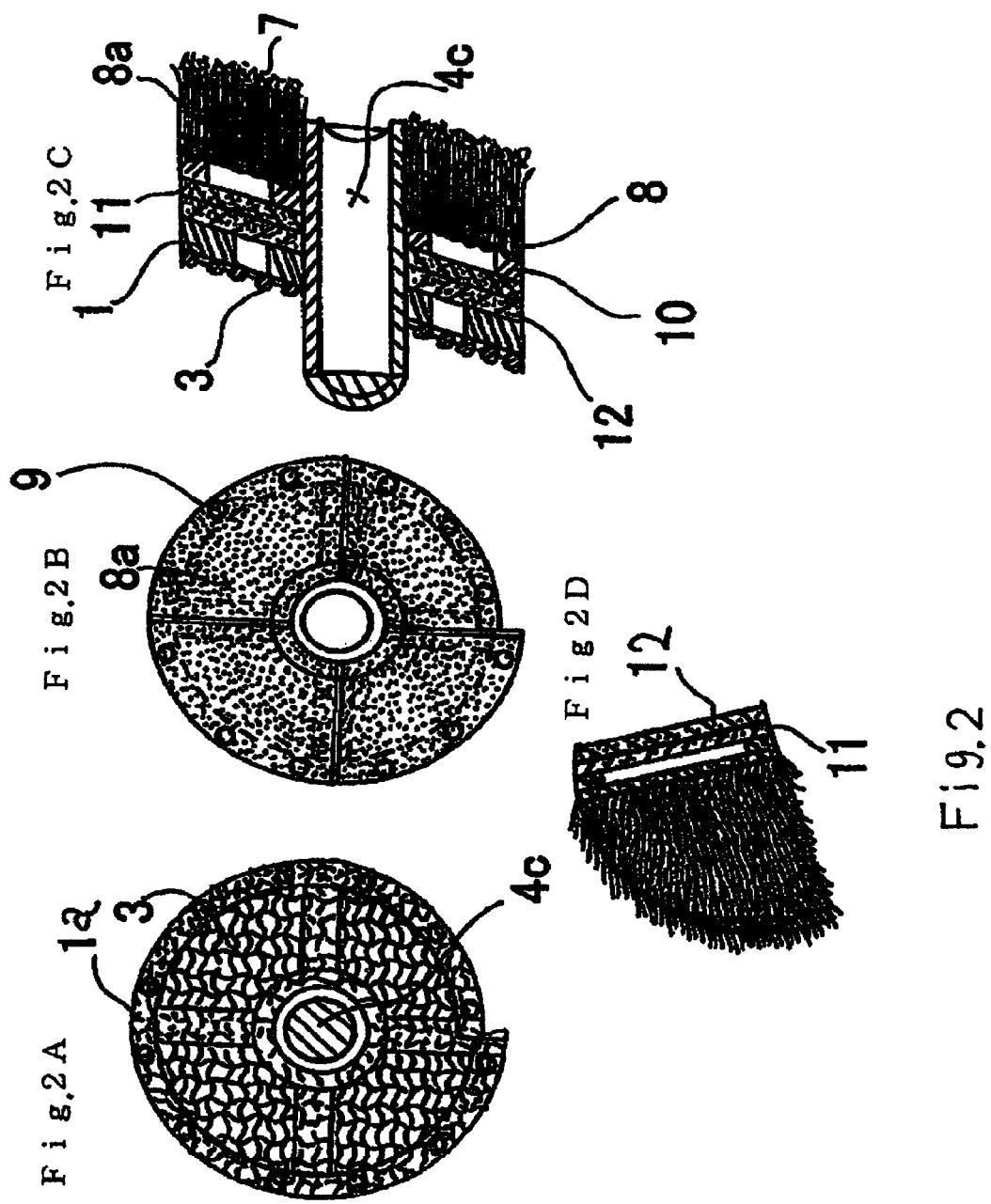
FIG. 2A is a diagram illustrating a metal net attached to the spiral shaped frame of a particle filter.
FIG. 2B is a diagram illustrating fibers installed to the spiral shaped frame of the particle filter.
FIG. 2C is a diagram illustrating a fiber filter made with a disc which has a large number of fine holes with fibers fastened to these holes.
FIG. 2D is a diagram illustrating a gap adjusting magnet sheet panel and a magnet sheet which are installed to the fiber disc.

Details of an exemplary construction for the spiral shaped filter are shown in FIG. 2A, FIG. 2B, FIG. 2C, and FIG. 2D. FIG. 2A shows a cross-sectional view of the spiral frame portion 1$a$ (same as 1$b$) with attached metal net 3 mounted on shaft 4$c$. As shown in FIG. 2B, the metal net can be attached to the spiral frame 1 *b* using bolts 9. Other conventional attachment methods can alternatively be used.

FIG. 2B shows an exemplary method of attaching the filter fiber 8*a* to the spiral shaped frame 1 *b*. FIG. 2B shows a metal disk or blade panel 8 having a large number of fine holes (e.g., drilled holes) with metallic and synthetic fibers 8*a* mounted in the holes, forming a filter panel. Because the rear side of the metal disk 8 is not smooth due to the metallic and synthetic fibers installed in the disk holes, glue cannot be used, therefore, a gap adjusting panel 10 is installed, and at the same time glue can be used to attach the magnet sheet attachment panel 11 and the magnet sheet 12. The magnet sheet 12 will stick to the spiral shaped frame 1 *b* freely to become a part of the structure. FIG. 2C shows a partial side view of the completed filter with the filter fibers 8*a* mounted in metal disk 8. It shows that some very fine particles 7 from exhaust gas are stuck to the filter fibers 8*a*. FIG. 2D shows a perspective view of a portion of a complete filter panel with gap adjusting panel, magnet sheet attachment panel 11 and magnet sheet 12. It should be recognized that while the illustrated construction is advantageous, other methods for connecting the filter panel to the spiral frame could also be used.

Figure 3:
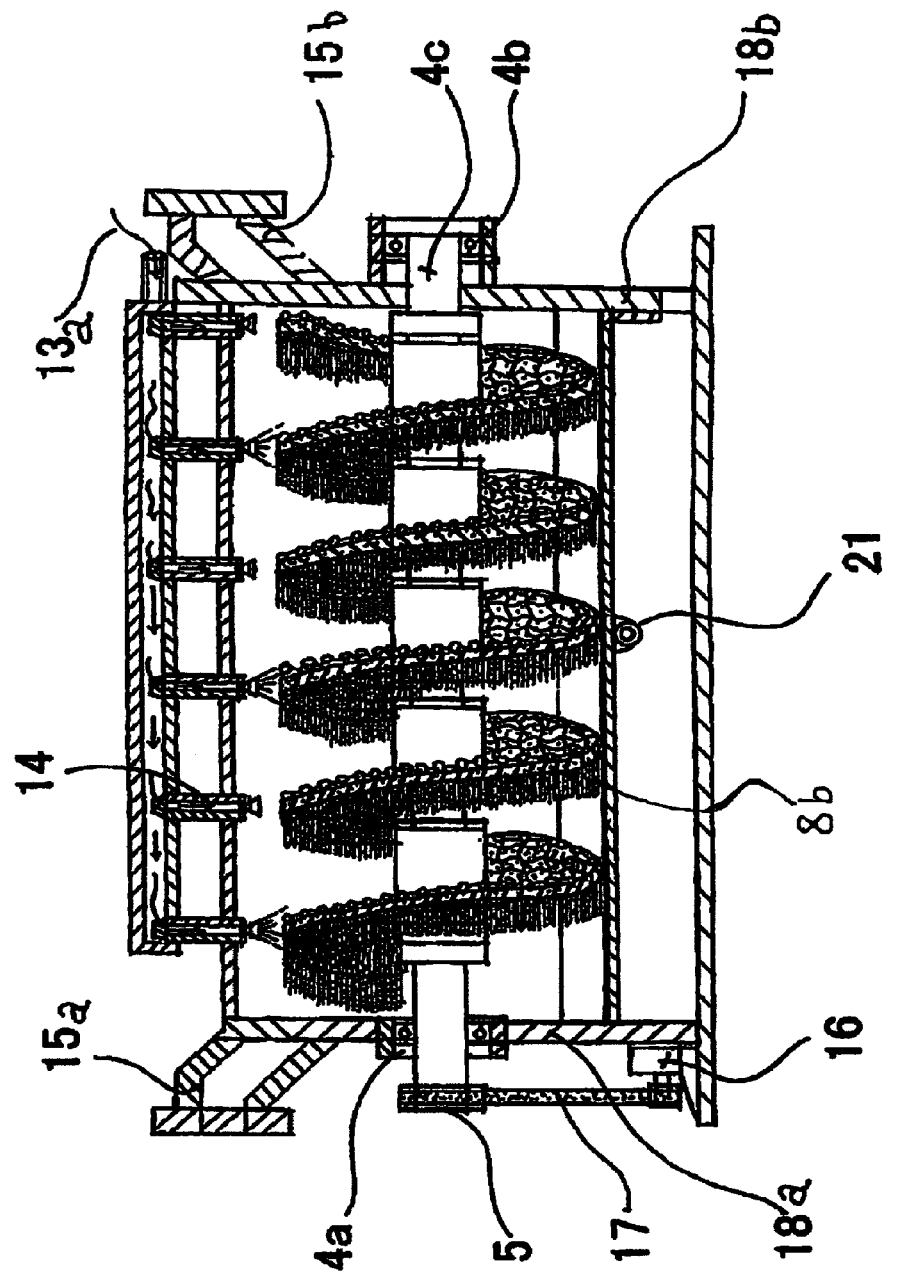
FIG. 3 is a longitudinal cutaway diagram illustrating a filter tank with spiral shaped frame particle filter with shaft, bearings, a fiber filter, a motor, a belt, washing nozzles, an exhaust gas inlet connection pipe, and an exhaust gas outlet connection pipe mounted therein.

FIG. 3 shows a cutaway side view of a completed exhaust gas filter with filter tank A. A spiral shaped filter unit with the filter fiber 8*b* attaching to the spiral shaped frame is mounted in a housing tank. Carrier bearings 4*a* and 4*b* are installed at each end of the shaft 4*c*, and a drive pulley 5 is installed at the end of the shaft 4*c* also.

Motor 16, belt 17, and pulley 5 rotate the shaft 4*c*, e.g., at about 500 rpm. The exhaust gas to be cleaned will be fed from exhaust gas inlet connection pipe 15*a*, will flow through the fiber filter, and the fine particles will be trapped into the filter fibers. The cleaned exhaust gas will be then fed through the exhaust gas outlet connection pipe 15*b* to the second device in the system.

Washing water 13*a* is fed by the cleaning water pipe 13*b* to the washing nozzles 14. A waste water outflow pipe 21 is installed at the bottom of the tank A. Waste water outflow pipe 21 will get rid of the water used to wash the tank A. The exhaust gas inlet connection pipe 15*a* will be connected to the CO2 source, e.g. exhaust gas emitting factory or power plant.

Based on the measurement performed at the exhaust gas outlet connection pipe 15*b*, the spiral shaped fiber filter devise will only filter the fine particles from the exhaust gas (e.g., from coal) and does not decompose the CO2 gas. The second major component of the systems, the CO2 decomposition and separation device 41 (FIG. 8) will decompose and separate the CO2 gas into carbon and oxygen.

Figure 4:
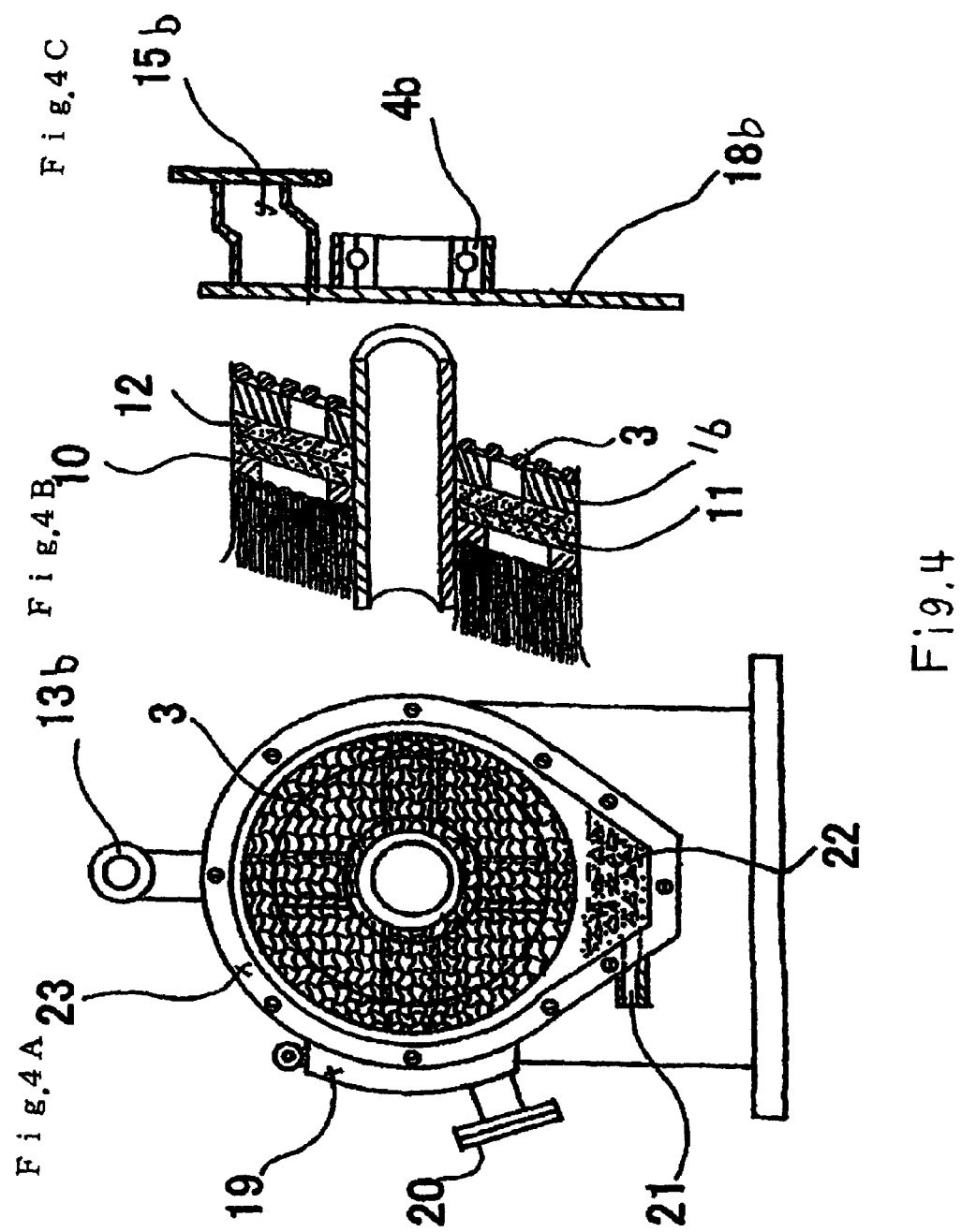
FIG. 4A is a diagram illustrating a filter tank with rear cover removed.
FIG. 4B is a diagram illustrating a fiber filter using metallic fiber and synthetic fiber.
FIG. 4C is a diagram depicting a rear cover of a filter tank.

FIG. 4A shows filter tank A with the rear cover 18*b* (see FIG. 4C) removed. The front cover 18*a* (see FIG. 5) and the rear cover 18*b* are installed to the cover installation flange surfaces 23 on each end. The washed out waste 22 shown in FIG. 4 can be taken out through the inspection doors 19 on both tank A and tank B shown in FIGS. 5 and 6. FIG. 4B shows a side cutoff view of the spiral shaped frame fiber filter assembly, essentially as illustrated in FIG. 2C. FIG. 4C shows a side view of the rear cover 18*b*, with exhaust gas outlet connection pipe 15*b*, carrier bearing and mounting for carrier bearing 4*b*.

Figure 5:
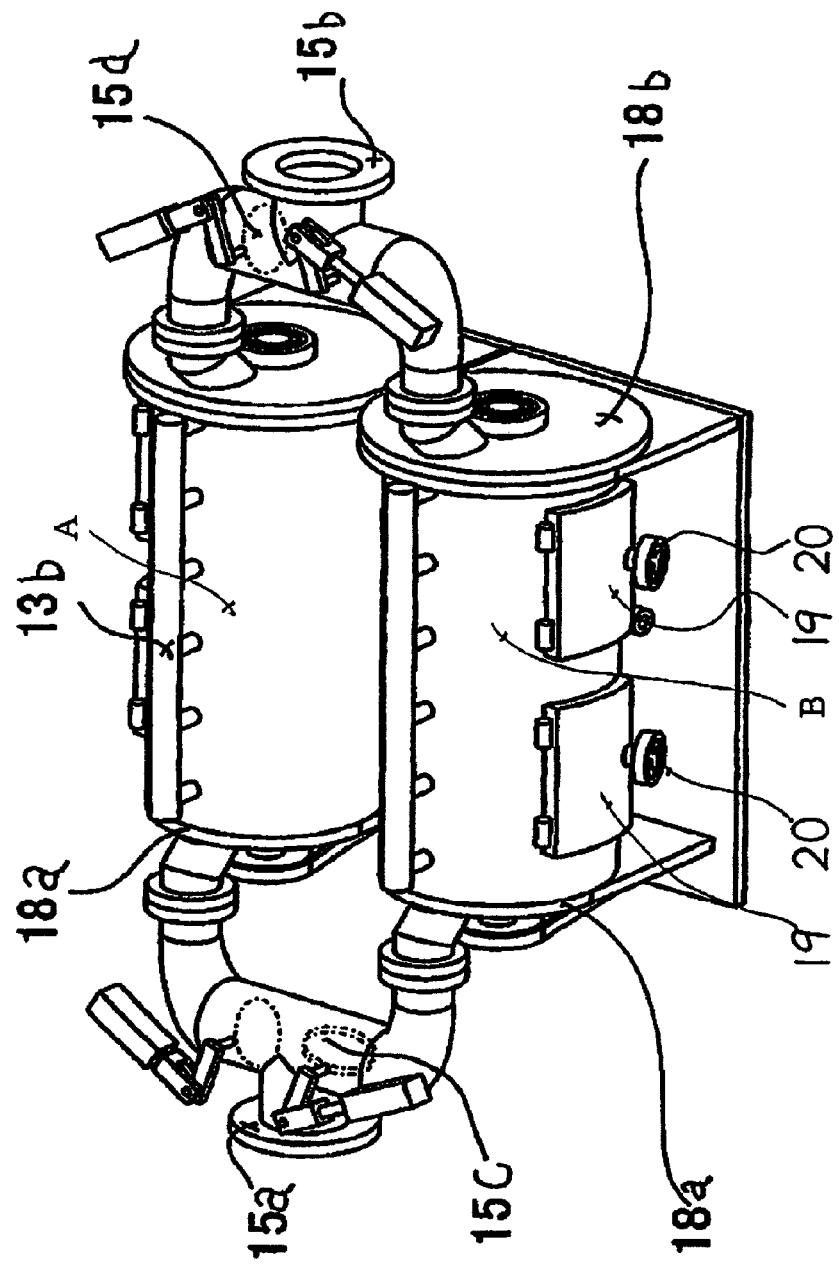
FIG. 5 is a diagram illustrating a perspective view of a completed spiral shaped frame fiber filter device with two filter tanks.

FIG. 5 shows the completed exhaust gas filter device using the spiral shaped frame fiber filter (item 40 in FIG. 8). In this embodiment, there are two filter tanks, tank A and tank B which may be essentially identical, connected in parallel. A timer switch can be installed on the control box 50 to switch the flow of exhaust gas from tank A to tank B and vise versa at a preset time period.

Two exhaust gas switching valves and air cylinders 15*c* and 15*d* are installed, one at the exhaust gas inlet side 15*a* and one at exhaust gas outlet side 15*b*, to control the flow of the exhaust gas. After a period of operation, one of the tank filters will be full of fine particles and the exhaust gas flow can become very slow due to the accumulation of fine particles stuck on that fiber filter. Thus, at a set time, the timer switch will trigger the exhaust gas switching valve and air cylinders 15*c* and 15*d*, and they will switch the exhaust gas flow from one tank to the other tank, isolating one of the tanks. At this time, the isolated tank filter will be washed and the exhaust gas will be directed to go through the other tank.

Figure 6:
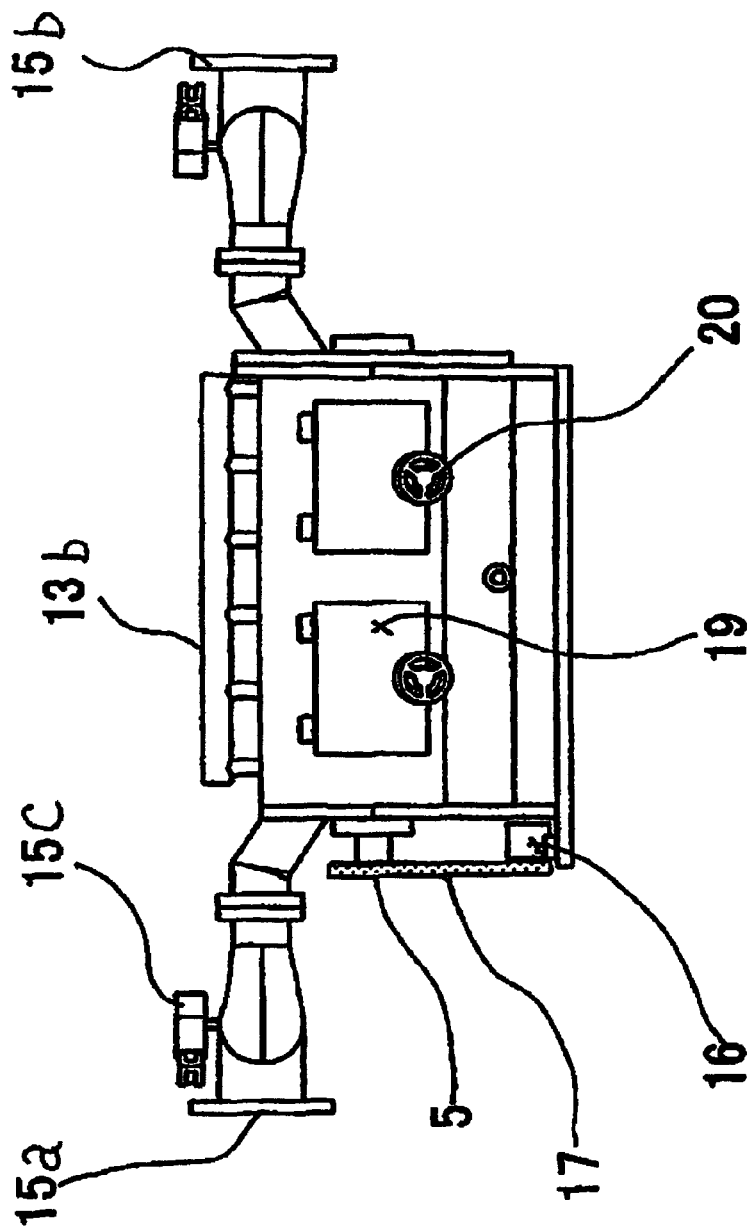
FIG. 6 is a diagram illustrating a side view of a completed spiral shaped frame fiber filter device.

FIG. 6 is a side view of the exhaust gas filter device 40 using the spiral shaped frame fiber filter. Two inspection doors 19 with an inspection door handle 20 are shown. Both Tank A and tank B have these inspection doors.

B. CO2 Decomposition and Separation Device

As previously indicated, the filtered exhaust gas from filter device 40 is directed to CO2 decomposition and separation device 41. This CO2 decomposition and separation device is described in Niioka, U.S. patent application Ser. Nos. 12/072,059, and 12/188,681, both of which are incorporated herein by reference in their entireties, including drawings.

This conversion and separation device breaks the carbon oxygen bonds in carbon dioxide ($CO_2$) as well as in some other air pollutants. The process results in separate particulate carbon (e.g., as graphite) and oxygen gas. The device overcomes current major technical challenges in reducing point source and/or ambient $CO_2$ concentrations.

The $CO_2$ conversion device is a generally closed device (except for suitable inlet and outlet connections) which includes two key components:

A $CO_2$ conversion chamber;

A graphite-oxygen separation chamber.

As is readily recognized, the device will also include components for gas and liquid handling. Such components can vary depending on the design and application for a particular system. Generally there will be a gas delivery network which includes a $CO_2$ gas source (e.g., from an exhaust gas particle filter in the present invention) and a series of distribution tubing and control components, e.g., tubing (often coated with a relatively non-reactive material such as Teflon®), valves, pressure regulators (e.g., that introduce, circulate, regulate and maintain pressure of $CO_2$ and 02 at desired levels in the system) and the like.

Likewise there will generally be a corresponding liquid handling network which includes components for storing, circulating, and distributing liquids in the devices, including, for example, tanks, pipes, valves, pressure gauges that introduce, circulate, regulate, and maintain pressure of electrolyte solution and a mixture (which may be in a colloid) of $CO_2$ and 02 at desired levels in the device.

The gas and liquid handling will usually be driven by a set of electrical and/or electromechanical devices (motors, pumps, pulleys, belts, .etc) that powers the $CO_2$ conversion device at desired speeds and pressures.

To convert $CO_2$ to graphite and oxygen under ambient condition, a gas with a high concentration of $CO_2$ (e.g., filter coal-fired plant exhaust gas) and electrolyte solution described herein are introduced by their respective delivery systems at desired levels to a pipe or the first of a set of pipes, e.g., 3 pipes, in series that are housed in the $CO_2$ conversion chamber. Typically the gas and electrolyte solution are introduced separately but in coordinated fashion, e.g., simultaneously. To ensure adequate mixing and interaction between $CO_2$ and electrolyte solution in these inductive pipes, each pipe is constructed with mixer, e.g., a shaft with mixing projections such as wings fixed to the shaft and arranged so that the shaft can be spun at high speed. In particular embodiments, the shaft has spiral shaped wings (e.g., 5 wings) welded or otherwise fixed to the shaft. Rotation of the shaft at high speed is believed to induce magnetism inside the pipes. When acidic $CO_2$ is mixed with alkaline electrolyte solution under such high speed mixing conditions, a filmy, gelatinous substance appears in the CO2 conversion chamber. While it is possible to design a device such that one or more of the pipes rotate (either instead of the shaft or in addition to the shaft such as in a counter rotating manner), in most cases it is simpler or more desirable to just rotate the shaft.

This jelly, filmy, gelatinous colloid is then directed to a graphite-oxygen separation chamber. A major component of the graphite-oxygen separation chamber is a filter. An advantageous configuration includes a hollow, cylindrical filter drum perforated with filters, e.g., tubular filters. For example, an exemplary filter drum is made of layers of synthetic silicon resin and perforated with tubular filers (182 such tubular filters in one case). In that example, each tubular filter is 35 mm in length, 15 mm in outside diameter with 10 mm inside diameter at the top, and 10 mm in outside diameter and 5 mm inside diameter at the bottom. Each tubular filter is tightly packed with fiberglass string roll at the top and loose fiberglass fibers at the bottom.

When the filter drum is spun at centrifuge speed inside the graphiteoxygen separation chamber, fresh electrolyte solution is injected to the center of the filter drum to create electrostatic induction that separates graphite from oxygen in the jelly like, filmy substance.

Under this condition, two reactions follow. First, graphite is attracted to loose fibers dangling from the bottom of tubular filters and is eventually washed and/or dislodged by electrolyte solution. Second, oxygen and un-processed CO2 passes through the tubular filters that are tightly packed with fiber string roll.

Excessively high pressure created by introducing the jelly like substance to and/or spinning the filter drum in the graphite-oxygen separation chamber at centrifuge speed is prevented and managed by installing a network of electromagnetic valves e.g., solenoid valves), liquid discharge nozzles, and gas discharge nozzles in the system. Activation of electromagnetic valves and liquid relief nozzle allows 1) graphite as well as fresh and spent electrolyte solution to be collected at electrolyte solution tank and 2) gases, such as oxygen and unprocessed $CO_2$, to flow to oxygen tank.

Conversion of $CO_2$ to graphite and oxygen under ambient condition is thus achieved.

Embodiments of a method and device for converting CO2 to carbon particles and oxygen under ambient condition will be understood more fully from the description given below and from the accompanying drawings of embodiments, which, however, should not be taken to limit the method and system to a specific embodiment, but are for explanation and understanding only. It will be recognized that variations can be made to the design within the scope of the invention.

As a preliminary matter, item identifiers used in the drawings of the CO2 conversion and separation device are listed below.

Figure 10:
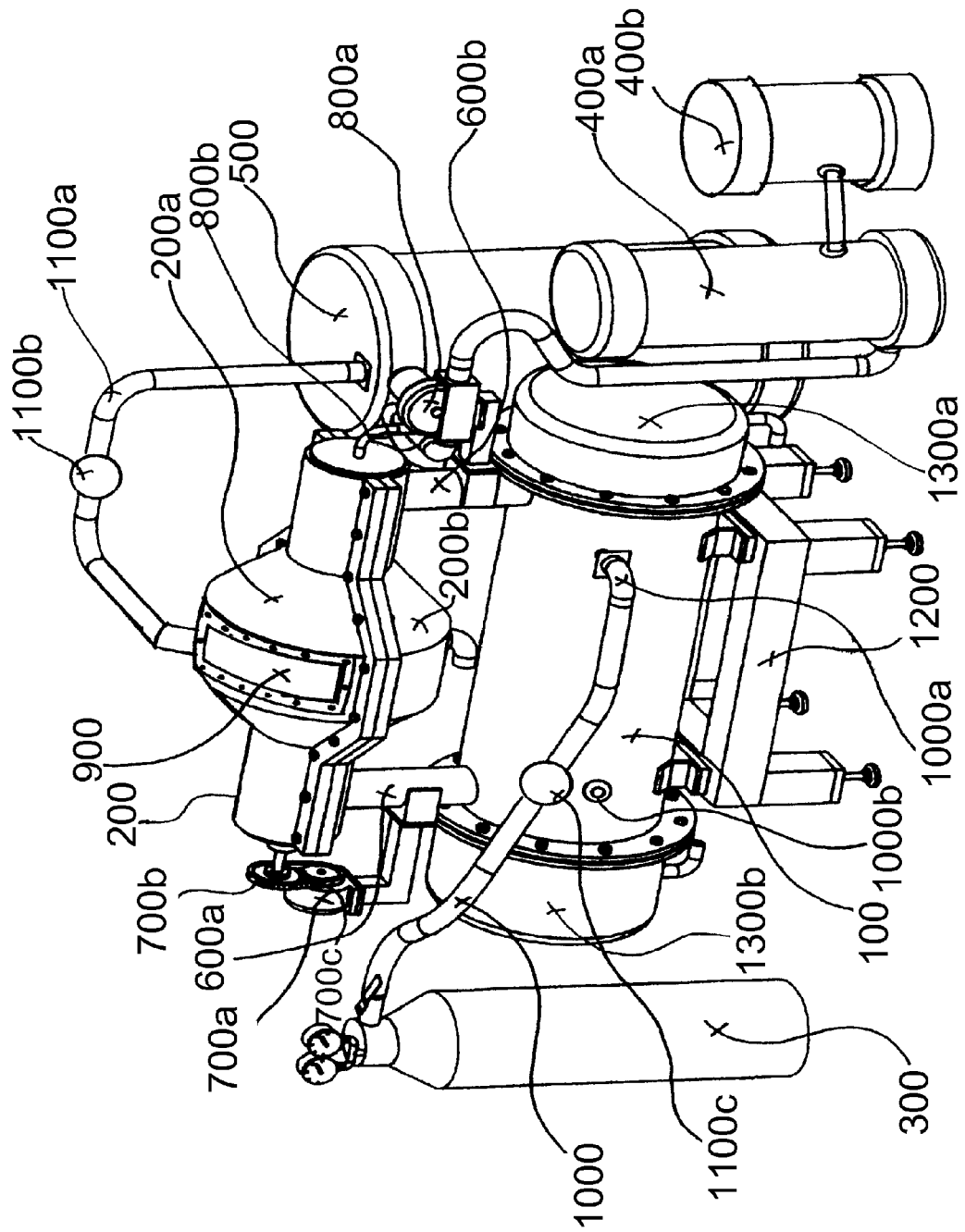
FIG. 10 is a diagram depicting front view of a $CO_2$ Conversion Device.

1. Item Identifiers for CO2 Conversion and Separation Device
100 $CO_2$ conversion chamber
200 Graphite-oxygen separation chamber
200a Top half of graphite-oxygen separator casing
200b Bottom half graphite-oxygen separator casing
Magnet for solenoid valves.
300 $CO_2$ cylinder with a certified concentration
400a Electrolyte solution tank
400b Electrolyte solution spare tank
Location of electrolyte solution injection nozzle
500. Collection tank for oxygen and un-processed CO2
600a Connecting pipe between $CO_2$ conversion chamber and graphite-oxygen separation chamber
600b Connecting pipe between $CO_2$ conversion chamber and graphite-oxygen separation chamber
700a Electric motor that powers rotation of filter drum
700b Pulley
700c Belt
Electric motor to rotate shaft 31
800a Pump that pumps electrolyte solution to graphite-oxygen separation chamber
800b Pipe for electrolyte solution
900 Door for changing filter drum
1000 Tubing connecting $CO_2$ tank to $CO_2$ conversion chamber
1000a Location of carbon dioxide injection nozzle
1000b Pipe with valve to drain excessive electrolyte solution from $CO_2$ conversion chamber
Pipe with valve to drain excessive electrolyte solution from $CO_2$ conversion chamber
1100a Tubing that leads gases from graphite-oxygen separation chamber to tank 5
1100b Pressure regulation valve
1100c Pressure regulation valve
1200 Stand that supports CO2 conversion device
1300a Cover of $CO_2$ conversion chamber
1300b Cover of $CO_2$ conversion chamber
c Drainage nozzle
Drainage nozzle
A coupling to connect shaft
Shield packing
Shield packing
Bearing
Bearing
Shaft for the rotation drum
Connection shaft
Main body of the centrifuge-separator rotation drum
Filter cover
Contact surface between the rotating drum and connecting pipes
Cap to prevent leakage of exhaust gas
Inductive filter drum that separates graphite from 02
Jet that discharges fresh electrolyte solution to filter drum to dislodge graphite from fibers and to prevent tubular filters from clogging
Liquid discharge nozzle
Gas discharge nozzle
Cross section of filter drum and graphite-oxygen separator
Electromagnetic valve
Electrolyte solution drainage pipe
Bolt hole
Rotating spiral shaped wings that induce magnetism in pipe 29a
b Rotating spiral shaped wings that induce magnetism in pipe 29b
c Rotating spiral shaped wings that induce magnetism in pipe 29c
Nozzle that injects colloid of $CO_2$ and electrolyte solution from pipe 29c to interior of $CO_2$ conversion chamber
Connecting pipe between pipes 29a and 29b
Connecting pipe between pipes 29b and 29c
Flow direction of colloid of $CO_2$ and electrolyte solution toward connecting pipe between 2 chambers
Flow direction of $CO_2$ toward pipe 29a
Flow direction of electrolyte solution toward pipe 29a Inductive pipe caused by spinning electrolyte solution inside at high speed
Inductive pipe caused by spinning electrolyte solution inside at high speed
Inductive pipe caused by spinning electrolyte solution inside at high speed
Supplemental parts that ease wearing of shaft 31
Shaft
Shaft axis of pipe 29*a*
Shaft axis of pipe 29*b*
Shaft axis of pipe 29*c*
Key of supplemental part 41 *p*
Cap
Blind flange
Packing
Flange
Shaft lineup flange
Sleeve main body
Bolt
Bolt
Gland packing
Washers
Spring
Cap for the sleeve main body
Bearing attachment bracket
A piece of pipe serves as bearing receptacle and connection pipes 6*a*, 6*b*.
Supplemental part with ceramic coating
Supplemental part viewed from left side
Supplemental part with ceramic coating
Direction of extracting supplemental parts
Slot made on the supplemental part 42*p* for attaching extraction tool
Handle of an extraction tool
Extraction tool for changing supplemental parts
Key seat
Layer of silicon resin made of synthetic fibers
Synthetic silicon resin
Synthetic silicon resin adhesive
Pile cut textile
Tubular filter
Side view of tubular filter showing a tapering bottom
Flow direction of oxygen and CO2
Tightly packed fiber string roll
Loose fiberglass fibers
Fiberglass fibers used in making filter strings
Jelly like film resulting from mixing $CO_2$ and electrolyte solution in inductive environment
Black dots denote graphite in filmy, gelatinous substance being attracted to tubular filters
The side without $CO_2$ gas leak, gases all pass through tabular filters 2. Design and Setup of CO2 Conversion Chamber FIG. 10 depicts the front view of an example of a fully integrated CO2 conversion device. In the description below, the particular design, including dimensions, materials, numbers of particular components, and other characteristics of the device should be understood to be illustrative and not limiting.

The device includes a $CO_2$ conversion chamber 100 and a graphite-oxygen separation chamber 200. To begin converting $CO_2$ to graphite and oxygen, $CO_2$ gas and electrolyte solution is injected separately but simultaneously to chamber 100 from a $CO_2$ source, e.g., cylinder 300, and an electrolyte solution tank 400*a* through their delivery systems at desired levels. After conversion, the colloid of $CO_2$ and electrolyte solution is directed to graphite-oxygen separation chamber 200 via two connecting pipes 600*a* and 600*b*.

In this exemplary device, electrolyte solution storage tank 400*a* is made of SUS 304 stainless steel. Its size is 590 mm in diameter, 900 mm in height and volume of about 200 liters. The size of the electrolyte auxiliary electrolyte storage tank 400*b* is 490 mm in diameter and 600 mm in height and the volume is about 120 liters. It is made of SUS 304 stainless steel. The size of the oxygen collection tank 500*a* is 1200 mm in outside diameter and 1300 mm in height and is made of steel with the tank interior coated with epoxy resin.

There are four additional illustrations that provide overview of the CO2 conversion device: The $CO_2$ conversion device sits on stand 1200.

The detailed design of filter drum in chamber 200 is discussed in sections III and IV below. The size of the $CO_2$ conversion chamber 100 is 1,600 mm in length and 600 mm in diameter. The size of cover 1300 is 300 mm in width and 600 mm in inside diameter and both covers are made of plastic material.

Inside the $CO_2$ conversion chamber 100, there are three pipes made of SUS-304 material (not shown). These pipes are specially designed, interconnected, and in series to ensure continuous mixing of $CO_2$ and electrolyte solution in the pipes. Five spiral shaped wings similar to that of are welded to shafts (not shown), respectively using argon gas welding process. The wings serve to enhance mixing and interaction of $CO_2$ with electrolyte solution in each pipe.

The size of pipe is 1,200 mm in length, 145 mm in outside diameter, 3.0 mm in thickness and make of SUS 304 stainless steel. The shafts are installed in the center of the respective pipes. Supplemental parts are installed to shaft to ease its wearing. The size of the shaft is 1500 mm in length and 25 mm in diameter and is made of SUS-304 material. The size of the rotating electrode spiral shaped wings is made of SUS-304 material and 150 mm in length and 100 mm in outside diameter.

A cap with a 28 mm hole is installed on each end of a pipe so that shafts can be extruded (a total of six caps on three pipes). Each cap is made and installed in such a way that $CO_2$ gas or electrolyte solution would not leak from the end of a pipe. Blind flanges, packing, shaft lineup flanges with three 28 mm holes, and flange with bolt holes (not shown) are constructed to support installation of three shafts to the $CO_2$ conversion chamber 100. Each end of $CO_2$ conversion chamber 100 is capped with a cover 1300*a* or 1300*b* and equipped with a drainage pipe (not shown), respectively. Six bearings (not shown) and other parts are designed and installed to shafts to provide smooth rotation.

An electrical motor 700*a* with pulley 700*b* and belt 700*c* provide rotating power to the shaft in pipes which quickly become inductive when CO2 and electrolyte solution inside are spun at high speed.

Shaft is installed in the center of sleeve, and shaft is assembled with a gland packing, washer, spring, sleeve cap, bearing attachment bracket, shield packing, bolts, and bearing (not shown). Rotation of shaft is provided by an electric motor (not shown).

A ceramic coating is applied to shaft to slow down corrosion and wear of shaft. Due to extreme corrosive conditions in the $CO_2$ conversion chamber, average life cycle of shaft without ceramic coating is only about 50 hours. This results in frequent change and service of shaft as well as long periods of down time of the $CO_2$ conversion device.

Improvements are made to shaft and its related components with a key 43 to prevent unauthorized service or tempering. First, a slot is made on the edge of supplemental part for attaching extraction tool. is then inserted into shaft. Another supplemental part is installed on the outside of part (not shown). A ceramic coating is applied to surfaces of shaft to a thickness of about 50 micrometer. Other thickness may also be selected depending on the particular application, e.g., about 20 to 50, 30 to 60, 40-70, or 50 to 100 micrometer. The material selected for the ceramic coating in this example is chromium oxide applied with plasma spraying equipment. The size for the supplemental part is 50 mm outside diameter and 150 mm in length and made of SUS-304 material and the size for supplemental part is 130 mm in length and 51 mm in outside diameter and also made of SUS-304 material. is a supplemental part viewed from left side (not shown).

With these improvements in place, the life cycle of shaft 31 has increased by about 100 times to 5,000 hours and shaft and its associated components can now be readily retrieved, serviced and replaced with less time and effort. Extraction tool (not shown) can be used to remove supplemental parts. A technician can easily use handle to extract supplemental parts following the direction shown in.

3. Operations of CO2 Conversion Chamber

Electrolyte solution from tank 400*a* is pumped by pump 800*a* to CO2 conversion chamber 100 while $CO_2$ from cylinder 300 is piped to $CO_2$ conversion chamber 100 via Teflon tubing 1000 at its desired level by a pressure regulator 1100*c* (FIG. 10). Rotating speed of pump 800*a* is determined by concentration of $CO_2$ in the chamber so that operator can control optimum mixing of $CO_2$ with electrolyte solution in pipes. For example, when 99.7% $CO_2$ is used, the motor speed that controls the flow rate of the electrolyte solution is set at 1,900 rpm. Excessive electrolyte solution is directed to electrolyte solution storage tank 400*a* via overflow pipes 1000*b*.

Specifically, electrolyte solution as described in herein is powered by pump 800*a* in the direction to pipe through nozzle located at the center of pipe (not shown). $CO_2$ is fed simultaneously but separately in the direction to pipe through nozzle 1000*a* located also in the center of pipe. As soon as the desired pressure for $CO_2$ and electrolyte solution is reached, power is then switched on to rotate the shafts in pipes to make sure $CO_2$ and electrolyte solution freely flow past spiral shaped wings, thus enhance mixing interaction of $CO_2$ and electrolyte solution in the pipes.

Pipes quickly become inductive when $CO_2$ and electrolyte solution inside are spun at high speed (not shown). In other words, when a colloid of $CO_2$ and electrolyte solution is mixed and treated this way, friction occurs in the vicinity of rotating spiral shaped wings due to constant movement and contact between electrolyte solution and edge of spiral shaped wings. An electrical field is generated from impulse and oscillation, and pipes become inductive.

It is theorized that under this environment, a majority of bipolar molecules in the electrolyte solution break down, generate cations and anions, and release exothermic energy that, under inductive condition, is sufficient to convert $CO_2$ to graphite and 02. Hence the conversion of $CO_2$ to graphite and oxygen is successfully accomplished.

4. Design and Setup of Graphite-Oxygen Separation Chamber

When acidic $CO_2$ is mixed with alkaline electrolyte solution in pipes in which shafts are spun at high speed, a filmy, gelatinous substance appears in these inductive pipes. This substance consisting of graphite, oxygen, electrolyte solution and un-processed $CO_2$ eventually reaches nozzle, which in turn injects this jelly, filmy substance to the interior of $CO_2$ conversion chamber 100 (not shown). The filmy substance is then directed to graphite-oxygen separation chamber 200 via connecting pipes 600*a* and 600*b*. The size of the connecting pipes 600*a* and 600*b* in this exemplary device is 400 mm in length and 120 mm in outer diameter. These two pipes are installed horizontally to the right and left side of the graphite-oxygen separation chamber 200 (not shown).

If viewing a cross-section of the filter drum and graphite-oxygen separator (not shown), the main component inside the graphite-oxygen separation chamber 200 is a hollow, cylindrical rotation drum. The filter drum assembly in this case is made of layers of synthetic silicon resin glued together with silicon resin adhesive (not shown) and perforated with a large number of tubular filters (not shown). In an exemplary device, one hundred and eighty two (182) tubular filters were used. Each layer of silicon resin is made of synthetic fibers (not shown). The size of rotation drum in the exemplary device is 1,200 mm in length and the central drum diameter is 500 mm. It takes approximately 1,500 mm by 500 mm with 10 mm thickness of layers of synthetic silicon resin sandwich to construct a cylindrical, hollow rotating filter drum (not shown). The synthetic silicon resin sandwich is then constructed (not shown). A synthetic fiber, a synthetic-resin silicon layer, and a synthetic silicon adhesive 45*b* are stacked together with a pile cut fiber to form the synthetic silicon resin sandwich. The filter drum is installed inside the rotation drum (not shown) and can be serviced or replaced through door 900 (FIG. 10). The size of plastic tubular filter in the exemplary device is 35 mm in length, 15 mm in outside diameter with 10 mm inside diameter at the top, and 10 mm in outside diameter with 5 mm inside diameter at bottom.

The rotation drum is firmly positioned and framed by two casings: upper half casing 200*a* and lower half casing 200*b*. The contact surface between the rotation drum and connecting pipe connects the outer body and the cap to prevent gas leakage (not shown). The filter drum is constructed by shaping synthetic silicon resin sandwich into circular form (not shown). One hundred and eighty-two 14 mm holes are drilled through 3 layers of silicon resin. Plastic tubular filter that packed with fiber string roll is then forcefully inserted to each hole. Synthetic silicon resin adhesive is used to seal surroundings of each tubular filter (not shown) to prevent gas leak.

The length of the upper casing 200*a* and lower casing 200*b* for filter drum is 1400 mm and the largest outside diameter is 600 mm (not shown).

Construction of tubular filter is as follows. Fiberglass fibers are first made into strings and then rolled tightly into a filter string roll (not shown). Tightly rolled fiber roll is then forcefully inserted from the top into tubular filter (not shown). Due to a larger inside diameter at the top and smaller ID at bottom portion of tubular filter, (not shown) tightly packed fiber string roll will fit tightly inside the full length of tubular filter while the bottom portion of the tubular filter is dangling with loose fiberglass fibers (not shown)

Two shield packings (not shown) and two bearings (not shown) are installed on the shaft and connection shaft of the filter drum to provide a smooth rotation (not shown). Pipe serves as bearing receptacle to link with connection pipes 600*a* and 600*b*. An electrical motor 700*a* with pulley 700*b* and belt 700*c* provides the rotating power to shaft which in turn rotates filter drum at centrifuge speed and causes the filmy substance from the $CO_2$ conversion chamber 100 to flow into graphite-oxygen separation chamber 200 via connecting pipes 600*a* and 600*b*.

5. Operations of Graphite-Oxygen Separation Chamber

When filter drum is spun at centrifuge speed inside the graphite oxygen separation chamber 200, fresh electrolyte solution is injected via pipe 800*b* to the center of the filter drum. Such operations make the filter drum inductive and facilitate separation of graphite from oxygen (not shown).

Electrolyte solution released from jet/nozzle (which is installed at the end of pipe 800b is used to wash and dislodge graphite from loose fibers and to prevent the tubular filters from clogging (not shown). Cap is installed at each end of the filter drum assembly to prevent leakage of liquid and gas (not shown). Furthermore, because after long hours of operation the tubular filters may become clogged with graphite, a timer is preferably installed to control the washing operation.

With reference again to jelly, filmy substance (not shown) coming out of the $CO_2$ conversion chamber 100, this substance is redirected following the direction as shown in (not shown) to the filter drum in the graphite-oxygen separation chamber 200 via connecting pipes 600a and 600b. At this time, filter drum is spun at centrifuge speed and fresh electrolyte solution is injected from pipe 800b to the center of filter drum (not shown). Just like what happens in the $CO_2$ conversion chamber, high speed spinning of filter drum that contains a colloid of graphite, oxygen, un-processed $CO_2$ and electrolyte solution made the filter drum inductive. Due to the high rotation speed and more electrolyte solution, the electrostatic induction created in the filter drum is typically stronger than the one in the $CO_2$ conversion chamber 100.

As a result, graphite in the colloid is attracted and migrates to loose fibers of tubular filters (not shown). Graphite is washed off from tubular filters in graphite-oxygen separation chamber 200 with electrolyte solution. The electrolyte solution that contains graphite eventually is fed to electrolyte solution storage tank 400a. Introduction of jelly, filmy substance from CO2 conversion chamber 100 to graphite-oxygen separation chamber 200 via connecting pipes 600a and 600b and/or spinning of filter drum at centrifuge speed creates high pressure in the device. To prevent excessive build-up of high pressure in the device, an electronically controlled network of magnet for solenoid valve, electromagnetic valves, liquid discharge nozzle, and gas discharge nozzle is installed to adjust gas pressure (not shown).

Deactivation or closure of the magnet and electromagnetic valve stops the flow of jelly, filmy substance to graphite-oxygen separation chamber 200. Activation of both valves allows graphite along with spent and fresh electrolyte solution plus trace of $0_2$ and un-processed $CO_2$ to be piped to electrolyte solution storage tank 400a via liquid discharge nozzle. Activation of both the magnet and electromagnetic valve also allows oxygen (which has passed through tubular filters (not shown)) along with unprocessed $CO_2$ plus trace of electrolyte solution to be piped to collection tank 500 (FIG. 10) via gas discharge nozzle (not shown) and Teflon tubing 1100a and valve 1100b (FIG. 10). Contents of tank 500 can be drained via pipe (not shown).

C. Design and Set Up of a Carbon Filter Device using a Declined Angle Approach and a Carbon Collection Device As indicated above, electrolyte used in the CO2 decomposition and separation device will quickly load with particulate carbon and become ineffective unless the carbon is removed. Such removal can be accomplished using an electrolyte filter. Advantageously, the filter will effectively clean the electrolyte with low energy consumption. A suitable electrolyte filter device corresponding to item 42 in FIG. 8 is illustrated in FIG. 7.

Figure 7:
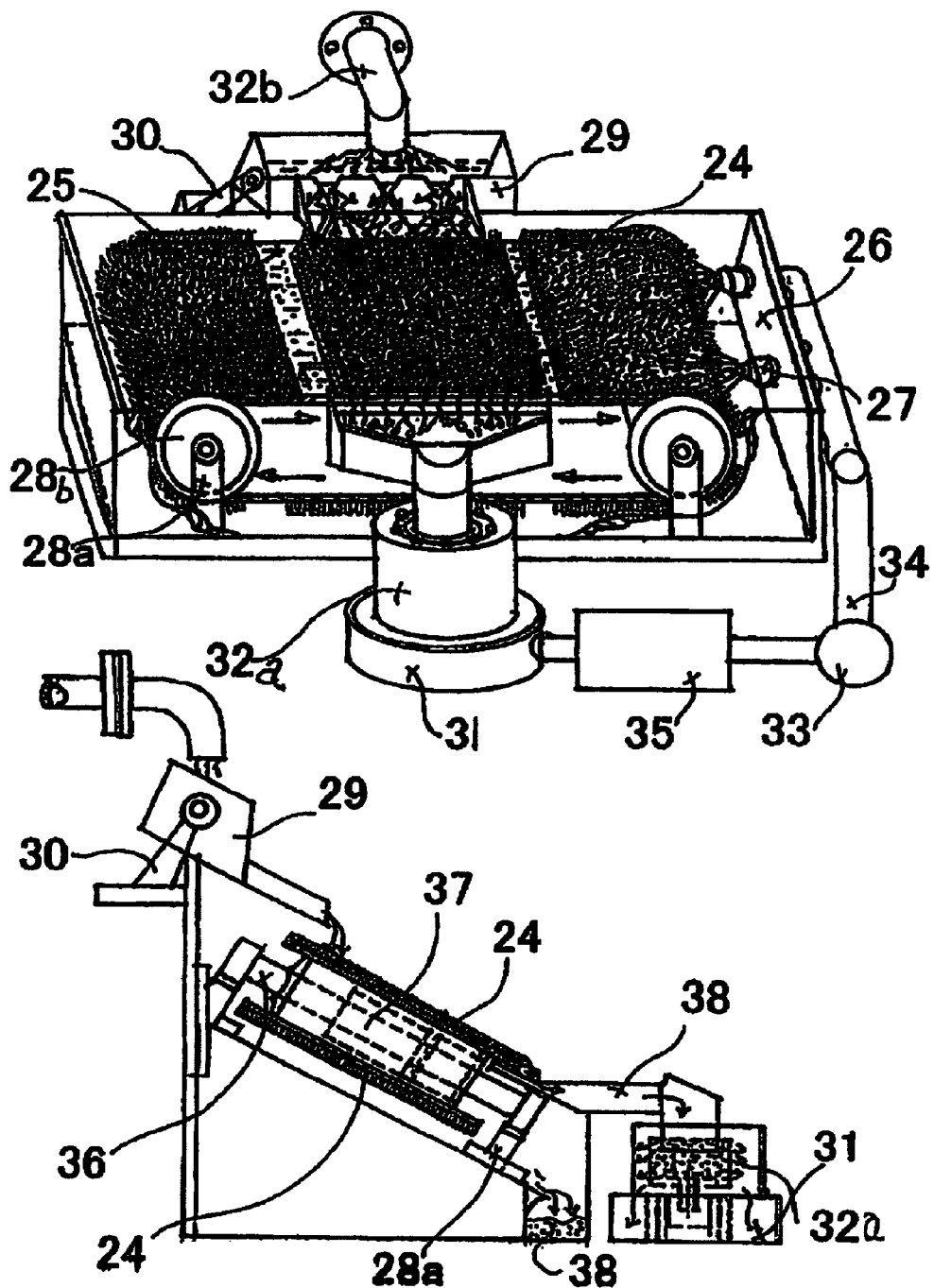
FIG. 7 is a diagram illustrating a perspective and a side view of a carbon collection filter device using a declined angle, for cleaning fine carbon particles from electrolyte solution.

Thus, FIG. 7 shows perspective and side views of a declined angle carbon fiber filter device 42, used to collect carbon from the electrolyte. The declined angle carbon filter has an outer case 26, with conveyer rolls 28b installed in it. A carbon collection fiber filter 24 is installed on the conveyer belt 25. In the design shown, six pieces of carbon collection fiber filter 24 are installed. A pile cut texture fiber is used in this design. An internal roll installation motor 37 is used to drive the conveyer roll 28b. The output power for the motor in an exemplary device is 3.5 horsepower and it rotates at 50 rpm. The driving motor and pump are controlled from control box 50. This control box 50 can be installed on the CO2 decomposition and separation device 41. All driving motors and pumps are preferably automatically controlled.

Figure 9:
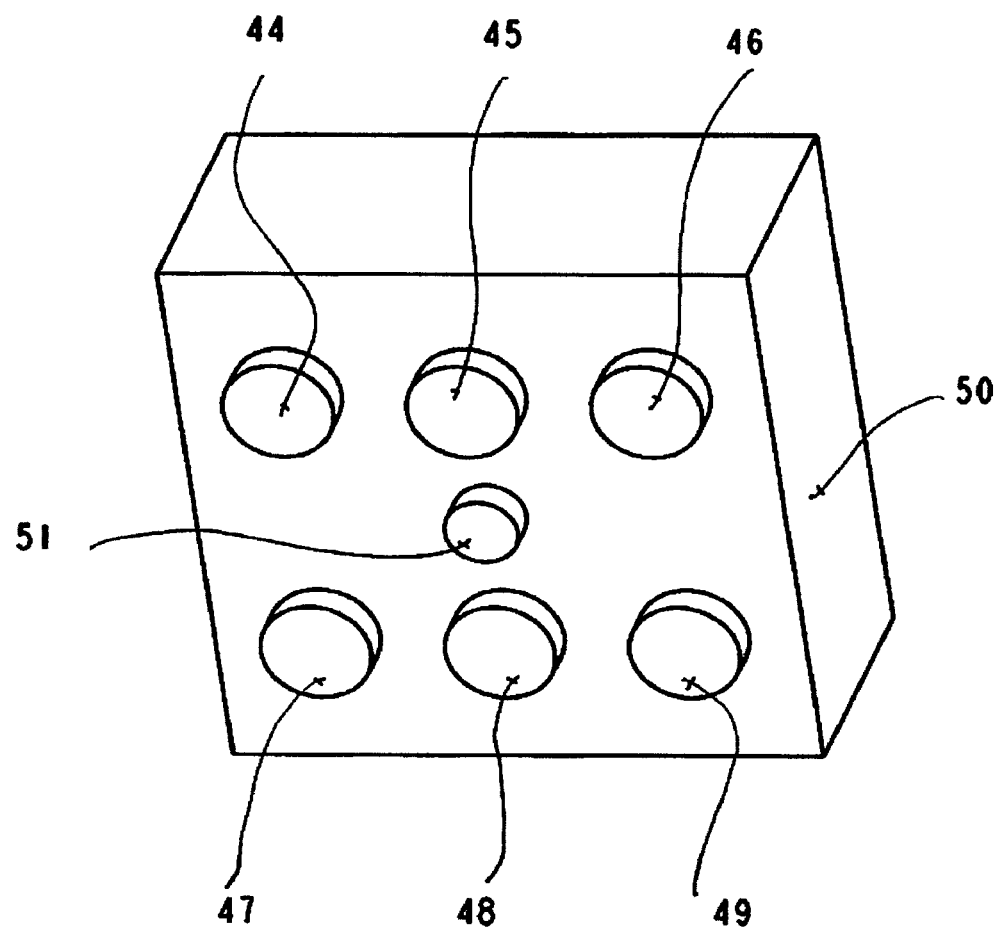
FIG. 9 is a diagram depicting an exemplary control box.

For the exemplary system, the control box 50 has six control switches and a timer switch installed on it. As depicted in FIG. 9, they are the CO2 decomposition and separation devise motor control switch 44, the CO2 decomposition and separation device blower control switch 45, the CO2 decomposition and separation device pump control switch 46, the exhaust gas filter device using the spiral shaped frame fiber filter motor control switch 47, the carbon filter device using the declined angle approach pump control switch 48, the carbon collection device to collect carbon from the electrolyte motor control switch 49, and a timer switch 51. The conveyer motor will rotate based on the timer switch 51.

As shown in FIG. 7, the electrolyte is pumped to the electrolyte collection box 29 from the electrolyte tank 4a of the CO2 decomposition and separation device 41 and through the electrolyte inlet pipe 32b. The electrolyte collection box declined angle adjustment devise 30 will adjust the flow of the electrolyte.

The electrolyte solution will flow from top to bottom of the carbon collection fiber filter 24. The carbon is in the form of very fine particle resulting from the decomposition of the CO2, and will penetrate into the center of the filter, and thus the carbon is separated from the electrolyte solution. By this method, the carbon is separated from the electrolyte solution and sticks to the fiber filter.

The carbon collection fiber filter 24 will be washed by the washing nozzle 27 with the washing pressure provided by the filter washing nozzle pump 33.

The washed carbon can go through a separator, e.g., centrifugal separator 31, to separate the carbon from the water.

Using the electrolyte immersed filter tank 35, the filter washing pump 33 can continuously operate.

In summary, FIG. 1, FIG. 2, FIG. 3, FIG. 4, FIG. 5, and FIG. 6 describe an effective device to filter fine particles from the exhaust gas.

FIG. 7 describes a carbon filter device using a declined angle with fiber filter to allow the electrolyte to flow from top to bottom through the filter, allowing filtration with comparatively low electrical power usage.

D. Item Identifiers for Filter Devices

The following list identifies labeled items in the various drawings.

A Main tank A
B Main tank B
1a Partial part of a spiral shaped frame
1b Spiral shaped frame
2 Spiral shaped frame connection metal fittings
3 Metal net
4a Bearing
4b Bearing
4c Shaft
5. Pulley
6. Bolt hole
7. Fine particles stick on the fiber
8. A panel with many holes to attach the metallic and/or synthetic fiber
8a filter fiber
8b exhaust gas filter with filter fiber
9 Bolt for installing metal net
10 Gap adjusting panel
11 Magnet sheet installation panel 12 Magnet sheet
13a wash water—arrow shows water flow direction
13b washing pipe
14 washing nozzle
15a Exhaust gas inlet connection pipe
15b Exhaust gas outlet connection pipe
15c Exhaust gas switching valve and air cylinder
15d Exhaust gas switching valve and air cylinder
16 Driving motor
17 Belt
18a Front cover 18b Rear cover
19 Inspection door for tank A and B
20 Inspection door handle for tank A and B
21 Waste water outflow pipe
22 Washed out waste
23 Cover installation flange surface
24 Carbon collection fiber filter
25 Conveyer belt
26 Outer case
27 Carbon washing nozzle
28a Frame
28b Conveyer roll
29 Electrolyte collection box
30 Electrolyte collection box angle adjusting device
31 Electrolyte collection tank
32 Electrolyte pipe
32a Centrifugal Separator
32b Electrolyte inlet pipe
33 Filter washing nozzle pump
34 Connection pipe
35 Electrolyte emersion filter tank
36 Roll shaft
37 Internal roll installation motor
38 Showing the carbon collected from the electrolyte
39 The factory
40 Exhaust gas filter device using the spiral shaped frame fiber filter
41 Patent pending CO2 decomposition and separation device
42 Carbon filter device using the declined angle approach
43 Carbon collection device to collect carbon from the electrolyte
44 Patent pending CO2 decomposition and separation device motor control switch
45 Patent pending CO2 decomposition and separation device blower control switch
46 Patent pending CO2 decomposition and separation device pump control switch
47 Exhaust gas filter device using the spiral shaped frame fiber filter motor control switch
48 Carbon filter device using the declined angle approach pump control switch
49 Carbon collection device to collect carbon from the electrolyte motor control switch
50 Control box
51 Timer switch All patents and other references cited in the specification are indicative of the level of skill of those skilled in the art to which the invention pertains, and are incorporated by reference in their entireties, including any tables and figures, to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the invention and within the following claims.

What is claimed is:

1. A system for cleaning CO2-containing gases and decomposing CO2, comprising:
    a fiber-based exhaust gas particle filter;
    a CO2 decomposition and separation device having gas passage connection with the outlet of said fiber-based exhaust gas particle filter, wherein said CO2 decomposition and separation device utilizes an electrolyte solution in decomposing CO2; and
    an electrolyte filter which filters carbon particles from said electrolyte;
    wherein the exhaust gas particle filter includes a tank comprising at least one exhaust gas inlet connection pipe, at least one exhaust gas outlet connection pipe, and a spiral-shaped filter element rotatably mounted therein; and
    wherein the spiral-shaped filter element comprises:
        a spiral-shaped frame attached to a central shaft with a metal net attached to the spiral shaped frame and spanning the space between said frame and said shaft; and a filter panel comprising a fiber mounting disk with a large number of fibers attached to a surface thereof, mounted on said spiral shaped frame and said metal net.

2. The system of claim 1, wherein said spiral-shaped frame is attached to said central shaft with at least one locking collar.

3. The system of claim 1, wherein said fibers are attached in a large number of fine holes in said fiber mounting disk.

4. The system of claim 1, wherein said filter frame or said metal net are primarily made of ferrous metals and said filter panel is magnetically mounted to said spiral frame and said metal net.

5. The system of claim 4, wherein said filter panel is mounted on said spiral frame and metal net with a gap adjusting panel attached to said disk with a magnetic sheet attached to said gap adjusting panel.

6. The system of claim 5, wherein said gap adjusting panel is attached to a magnet sheet installation panel glued to said magnetic sheet.

7. The system of claim 1, wherein the fiber-based exhaust gas particle filter further comprises a washer which washes particles from said fibers.

8. The system of claim 7, wherein said washer comprises a plurality of washing water nozzles fluidly connected with a wash water supply line.

* * * * *